July 7, 1925.  1,545,098
E. L. HARRINGTON
CLAM SHELL BUCKET
Filed Sept. 25, 1924
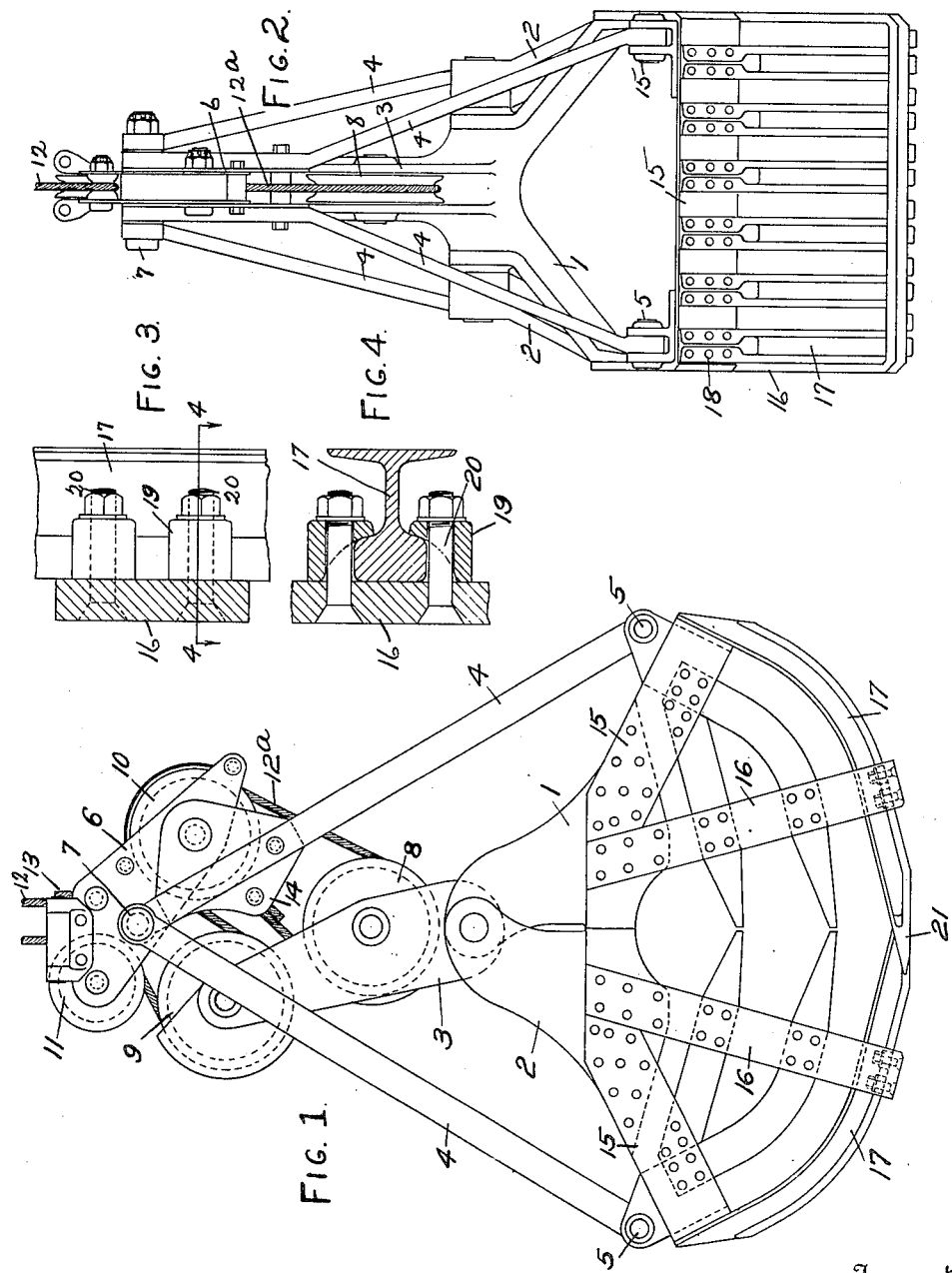
Inventor
Edward L. Harrington
By
Attorney Patented July 7, 1925.

1,545,098

UNITED STATES PATENT OFFICE.

EDWARD L. HARRINGTON, OF ERIE, PENNSYLVANIA, ASSIGNOR TO G. H. WILLIAMS COMPANY, OF ERIE, PENNSYLVANIA, A CORPORATION OF PENNSYLVANIA.

CLAMSHELL BUCKET.

Application filed September 25, 1924. Serial No. 739,942.

*To all whom it may concern:*

Be it known that I, EDWARD L. HARRINGTON, a citizen of the United States, residing at Erie, in the county of Erie and State of Pennsylvania, have invented new and useful Improvements in Clamshell Buckets, of which the following is a specification.

This invention is designed to improve the scoop members of clam shell buckets formed of tines. Numerous cross sections have been used for these tines but I have found that a tine with a cross section of the ordinary railroad rail gives very satisfactory results and is of great advantage in that in an emergency the material to renew the tine may be found at almost any place.

The invention is illustrated in the accompanying drawings as follows:—

Fig. 1 shows a side elevation of a clam shell.

Fig. 2 an end view of the same.

Fig. 3 a side elevation of one of the tines showing the securing means.

Fig. 4 a section on the line 4—4 in Fig. 3.

The scoop is formed with the connected frames 1 and 2. A closing lever 3 extends from one of the frames. Corner bars 4 are pivoted by pins 5 to the corners of the frames and extend to the head 6, one of the bars being journaled on a pin 7 on the head. Sheaves 8 and 9 are journaled on the closing lever and sheaves 10 and 11 on the head. A lifting cable 12 is secured to the head at 13 and a closing cable 12ª extends around the pulleys 11, 9, 10 and 8 and is secured to the head at 14. This general arrangement of clam shell forms no part of the present invention.

The frame has the loops 15 and 16 and the tines 17 which as before stated have the cross-sectional shape of a railroad rail are secured to the loops 15 and 16. The outer ends of the tines are arranged outside of the loops 15 and secured thereto by rivets 18. The inner ends of the tines extend within the loop 16 and are secured thereto by clamping hooks 19. These hooks are drawn down on the portion of the tines corresponding to the tread portion of the rail by bolts 20 which extend through the loops 16 and the hooks 19.

The ends of the rails are pointed. Where this cross section is hammered down the flange and tread portion naturally fills in the web making a desirable shape for the point.

What I claim as new is:—

1. In a clam shell bucket, the combination of a scoop frame; and tines of railroad rail cross section secured thereto.

2. In a clam shell bucket, the combination of a scoop frame; tines of railroad rail cross section secured thereto, the outer ends of the tines being secured to the frame through the flanged portion of the tines; and clamps engaging the tread portion of the tines securing the inner ends of the tines to the frame.

3. In a clam shell bucket, the combination of a scoop frame having two loops; tines of railroad rail cross section secured thereto, the outer ends of the tines being under the outside loop, the inner ends of the tines being inside the inner loop; and means for securing the flanges of the tines to the outer loop and of clamping the tread portion of the tines to the inner loop.

4. In a clam shell bucket, the combination of a scoop frame; and tines of railroad rail cross section secured thereto, the tines being pointed with a web space thickened from the flange and tread.

In testimony whereof I have hereunto set my hand.

EDWARD L. HARRINGTON.